United States Patent
Dall

(10) Patent No.: US 7,411,130 B2
(45) Date of Patent: Aug. 12, 2008

(54) CONVEYING WIRE

(75) Inventor: Thøge Hellesøe Dall, Egtved (DK)

(73) Assignee: DALTEC A/S, Egtved (DK)

( * ) Notice: Subject to any disclaimer, the term of this patent is extended or adjusted under 35 U.S.C. 154(b) by 188 days.

(21) Appl. No.: 10/542,777

(22) PCT Filed: Jan. 20, 2004

(86) PCT No.: PCT/DK2004/000029

§ 371 (c)(1),
(2), (4) Date: Mar. 15, 2006

(87) PCT Pub. No.: WO2004/065269

PCT Pub. Date: Aug. 5, 2004

(65) Prior Publication Data

US 2006/0163038 A1    Jul. 27, 2006

(30) Foreign Application Priority Data

Jan. 20, 2003   (DK) .............................. 2003 00049

(51) Int. Cl.
*H01B 7/00*  (2006.01)
(52) U.S. Cl. .................. 174/111; 198/716; 406/76
(58) Field of Classification Search ............. 174/111; 264/254; 198/716; 406/76, 81
See application file for complete search history.

(56) References Cited

U.S. PATENT DOCUMENTS 6,229,092 B1   5/2001   Pirovano
6,403,889 B1 *   6/2002   Mehan et al. ........... 174/120 R
6,790,399 B2 *   9/2004   Fujii ........................ 264/254

FOREIGN PATENT DOCUMENTS

| DE | 40 20 380 A1 | 1/1992 |
|----|---|---|
| DK | 1113/96 | 10/1996 |
| EP | 0156419 | * 10/1985 |
| EP | 0 659 661 | 6/1995 |
| EP | 0 767 116 | 4/1997 |
| SU | 373349 | 3/1973 |
| SU | 1585249 | 8/1990 |

* cited by examiner

*Primary Examiner*—Chau N Nguyen
(74) *Attorney, Agent, or Firm*—Antonelli, Terry, Stout & Kraus, LLP.

(57) ABSTRACT

The invention is a conveying wire (2) with disc-shaped conveying members (8) for use in endless tube conveyor systems. The wire (3) consists of a number of twisted strands (4) that each are made of thin threads or fibers, and including an outer jacket (6) to which the conveying members (8) are fastened directly by injection molding, where the outer jacket (6) consists of a polymer with a melting temperature which is lower than the melting temperature of the plastic material from which the conveying members are injection molded. The wire (3) is, for example, made as a balanced (torsionally neutral) wire consisting of at least three strands that each are made of very thin synthetic fibers which are individually surface treated with a polymer, providing great bending wearability to the fibers and good adhesion to the outer jacket (6) which consists of a polymer. The fact that the melting temperature of the disc material is higher than the melting temperature of jacket material produces a local softening of the outer jacket locally at the conveying members, so that an almost optimally good connection between the conveying members and the wire via the outer jacket is established.

33 Claims, 1 Drawing Sheet

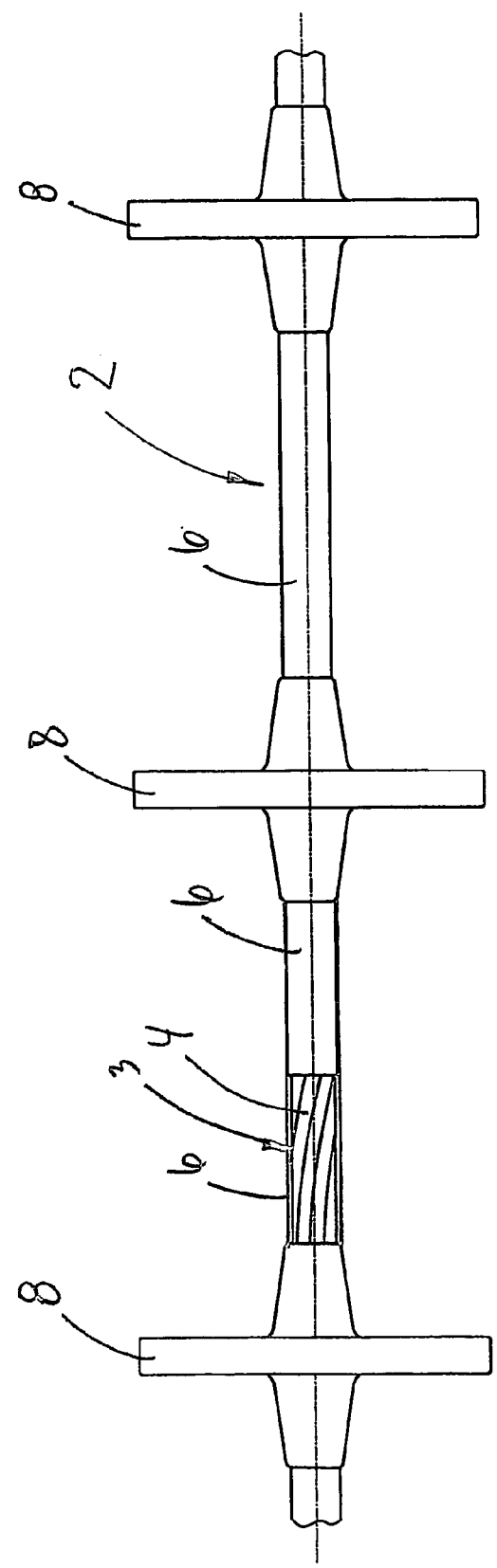

CONVEYING WIRE

BACKGROUND OF THE INVENTION

1. Field of the Invention

The present invention concerns a conveying wire with disc-shaped conveying members for use in endless tube conveyor systems, the wire consisting of a number of twisted strands that each are made of thin threads or fibers, and including an outer jacket to which the said conveying members are fastened directly by injection moulding.

2. Description of the Prior Art

EP-AI-0 659 661 describes a conveying cable made of polyester fibers, and which is intended for use by transporting material in tube conveying systems, where disc-shaped conveying members of polyurethane are fastened directly on an outer sheath which also consists of polyurethane.

The use of materials with the same melting temperature (same material) for both outer jacket and the disc-shaped conveying members has the drawback that sufficient adhesion via the jacket between conveying members and the fibers of the conveying wire is not achieved. This results in that the conveying members are having too inferior adhesion during use and are therefore displaced under load so that the jacket is destroyed also.

SUMMARY OF THE INVENTION

On that background, it is the purpose of the invention to provide an improved transport wire of the kind mentioned in the introduction, and which in a simple way enables achieving a quite extraordinary adhesion of the disc-shaped conveying members through the outer jacket and onto the fibers of the conveying wire.

The conveying wire according to the invention is characterized in that the outer jacket consists of a polymer with a melting temperature which is lower than the melting temperature of the plastic material from which the conveying members are injection moulded. In a particularly simple way is hereby achieved a quite extraordinary good adhesion between the disc-shaped conveying members via the outer jacket to the fibers in the wire. The fact that the melting temperature of the disc material is higher than the melting temperature of jacket material implies a softening of the outer jacket locally at the conveying members, so that an almost optimally good connection between the conveying members and the wire via the outer jacket is established.

In general, it is furthermore very advantageous to be able to operate with a conveying wire, where the outer jacket as well as the conveying members are made of materials approved for use with handling foodstuffs.

The conveying wire according to the invention is suitably designed so that the conveying members consist of synthetics with a melting temperature which is 10-40° C. higher than the melting temperature of the outer jacket which consists of a polymer. In other words, there is a rather small, yet sufficient difference in melting temperature of the conveying members and the outer jacket, respectively.

The conveying wire according to the invention is, however, preferably designed so that the conveying members consist of polyamide (nylon) with a melting temperature which is 20-30° C. higher than the melting temperature of the outer jacket which consists of polyurethane.

Suitably, the conveying wire according to the invention is furthermore designed so that the wire is made as a balanced (torsionally neutral) wire consisting of at least three strands that each are made of very thin synthetic fibers which are individually surface treated with a polymer, providing great bending wearability to the fibers and good adhesion to the outer jacket which consists of a polymer. In that connection it is, of course, very important that a very good adhesion between the strands of the wire itself and the outer jacket is ensured, so that the connection between the wire and the conveying members is also thereby stable and optimal.

A conveying wire of the actual type, where the wire consists of synthetic fibers, is furthermore very advantageous since its dead weight is much reduced compared with a usual conveying wire, were the basic wire consists of steel wire.

Most suitably, the conveying wire according to the invention is designed so that it is made as a balanced (torsionally neutral) wire consisting of at least seven strands that each are made of very thin paraamide fibers which are individually surface treated with a polymer providing great bending wearability to the fibers and good adhesion to the outer jacket which consists of a polyurethane. A further, very important advantage of a conveying wire with a basic wire of synthetic fibers and a smooth outer jacket and smooth conveying members connected therewith is that the conveying wire is very easy to keep clean and very easy to clean, for example, by passing an automatic cleaning station.

With the purpose of minimizing extending of the conveying wire, according to the invention this may advantageously be designed so that the wire is made with strands with lays having a length of the magnitude 50-150 mm, preferably about 100 mm, so that elongation of the wire is minimized.

Compared with prior art fiber wires of the kind in question, a very important advantage is hereby achieved, namely high rigidity that enables pushing the conveying wire according to the invention through pipe sections, in contrast to other known, braided fiber wires without an outer jacket which are so soft and bendable that it is quite impossible to push them through even relative short pipe sections, that is that prior art braided fiber wires without an outer jacket have to be pulled through pipe sections, which is a relatively cumbersome and time-consuming operation.

Alternatively, the conveying wire according to the invention can be made as a balanced, that is torsionally neutral, wire, preferably consisting of 7 strands that each are made of thin threads of steel, where the wire under heating by extrusion has been provided with the outer jacket consisting of polyurethane and which thereby has been integrated with the wire.

The conveying wire according to the invention has in other words extremely good properties in use, characterized by:
  that it can be made of food approved materials,
  that it has less longitudinal expansion due to tensile action and is easy to keep tensioned,
  that it has less weight, which compared with large flexibility and less bending force means that a system can have 20% more corners, and that it is unproblematic to have several turns after each other,
  that it has better coating with a smooth surface and which keeps itself clean even by moist material,
  that it has great durability—a factor 8 compared with know conveying wires.

BRIEF DESCRIPTION OF THE DRAWING

The invention is explained in more detail in the following in connection with the drawing that shows a side view of an embodiment of a conveying wire according to the invention.

DETAILED DESCRIPTION OF THE INVENTION

The conveying wire 2 shown on the drawing is made as a balanced, that is a torsionally neutral wire 3 consisting of a number of strands 4, for example seven strands 4, each consisting of a very large number of thin fibers of paraamide that are individually designed with a finish and provided with a surface coating with a polymer that has the purpose of ensuring large wearability at bends, long service life and extraordinary good adhesion to the outer jacket 6 which consists of polyurethane.

By the individual fibers of the strands 4 being surface treated with the polymer, there is simultaneously achieved an optimal surface treatment of the strands 4 so that the adhesion between the wire 2 and the outer jacket is optimal, which in turn means an optimal force transmission between the wire 2 and the disc-shaped conveying members 8 which are produced by injection moulding directly onto the outer jacket 6.

The conveying members 8 consist of polyamide (nylon) having a melting temperature which is 20-30° C. higher than the melting temperature of the outer jacket 6 which, as mentioned, consists of polyurethane. By injection moulding the conveying members 8 directly upon the outer jacket 6, a very short-termed heating and softening of the outer jacket 6 in the contact area with the conveying discs 8 occurs, so that the latter achieve better contact via the outer jacket 6 to the fibers of the conveying wire.

By tests it has furthermore been ascertained that the elongation of the wire varies between about 0.32% at a tensile force of 1000 N and about 1.4% at a tensile force of 5000N, as the wire as a whole has a tensile strength of the magnitude 30,000N. Other experiments have shown that for pulling a disc-shaped conveying member off the conveying wire, a tensile force in the magnitude 1700-2000N is required.

The invention claimed is:

1. A conveying wire including disc-shaped conveying members for use in endless tube conveyor systems, the wire consisting of twisted strands that each are made of threads or fibers, and including an outer jacket to which the conveying members are fastened directly by injection moulding, wherein the outer jacket consists of a polymer with a melting temperature which is lower than the melting temperature of the plastic material from which the conveying members are injection moulded.

2. A conveying wire according to claim 1, wherein the conveying members consist of synthetic material with a melting temperature which is 10-40° C. higher than the melting temperature of the outer jacket which consists of a polymer.

3. A conveying wire according to claim 2, wherein the conveying members consist of polyamide with a melting temperature which is 20-30° C. higher than the melting temperature of the outer jacket which consists of polyurethane.

4. A conveying wire according to claim 3, wherein the wire is made as a balanced wire consisting of at least seven strands that each are made of paraamide fibers which are individually surface treated with a polymer providing wear against bending by the fibers and adhesion to the outer jacket which consists of a polyurethane.

5. A conveying wire according to claim 2, wherein the wire is made as a balanced wire consisting of at least seven strands that each are made of paraamide fibers which are individually surface treated with a polymer providing wear against bending by the fibers and adhesion to the outer jacket which consists of a polyurethane.

6. A conveying wire according to claim 1, wherein the conveying members consist of polyamide with a melting temperature which is 20-30° C. higher than the melting temperature of the outer jacket which consists of polyurethane.

7. A conveying wire according to claim 6, wherein the wire is made as a balanced wire consisting of at least seven strands that each are made of paraamide fibers which are individually surface treated with a polymer providing wear against bending by the fibers and adhesion to the outer jacket which consists of a polyurethane.

8. A conveying wire according to claim 1, wherein the wire is made as a balanced wire consisting of at least three strands that each are made of synthetic fibers which are individually surface treated with a polymer, providing wear against bending by the fibers and adhesion to the outer jacket which consists of a polymer.

9. A conveying wire according to claim 8, wherein the wire is made as a balanced wire consisting of at least seven strands that each are made of paraamide fibers which are individually surface treated with a polymer providing wear against bending by the fibers and adhesion to the outer jacket which consists of a polyurethane.

10. A conveying wire according to claim 1, wherein the wire is made as a balanced wire consisting of at least seven strands that each are made of paraamide fibers which are individually surface treated with a polymer providing wear against bending by the fibers and adhesion to the outer jacket which consists of a polyurethane.

11. A conveying wire according to claim 1, wherein the wire is made with strands with lays having a length of the magnitude 50-150 mm. so that elongation of the wire is lessened.

12. A wire according to claim 11, wherein the lays have a length of about 100 mm.

13. A conveying wire according to claim 1, wherein the wire is made as a balanced wire consisting of a number of strands that each are made of threads of steel, where the wire under heating by extrusion has been provided with said outer jacket consisting of polyurethane and which thereby has been integrated with the wire.

14. A conveying wire including disc-shaped conveying members for use in endless tube conveyor systems, the wire comprising twisted strands that each are made of threads or fibers, and including an outer jacket to which the conveying members are fastened directly by injection moulding, wherein the outer jacket consists of a polymer with a melting temperature which is lower than the melting temperature of the plastic material from which the conveying members are injection moulded.

15. A conveying wire according to claim 14, wherein the conveying members consist of synthetic material with a melting temperature which is 10-40° C. higher than the melting temperature of the outer jacket which consists of a polymer.

16. A conveying wire according to claim 15, wherein the conveying members consist of polyamide with a melting temperature which is 20-30° C. higher than the melting temperature of the outer jacket which consists of polyurethane.

17. A conveying wire according to claim 16, wherein the wire is made as a balanced wire comprising at least seven strands that each are made of paraamide fibers which are individually surface treated with a polymer providing wear against bending by the fibers and adhesion to the outer jacket which consists of a polyurethane.

18. A conveying wire according to claim 15 wherein the wire is made as a balanced wire comprising at least seven strands that each are made of paraamide fibers which are individually surface treated with a polymer providing wear against bending by the fibers and adhesion to the outer jacket which consists of a polyurethane.

19. A conveying wire according to claim 14, wherein the conveying members consist of polyamide with a melting temperature which is 20-30° C. higher than the melting temperature of the outer jacket which consists of polyurethane.

20. A conveying wire according to claim 19, wherein the wire is made as a balanced wire comprising at least seven strands that each are made of paraamide fibers which are individually surface treated with a polymer providing wear against bending by the fibers and adhesion to the outer jacket which consists of a polyurethane.

21. A conveying wire according to claim 14, wherein the wire is made as a balanced wire comprising at least three strands that each are made of synthetic fibers which are individually surface treated with a polymer, providing wear against bending by the fibers and adhesion to the outer jacket which consists of a polymer.

22. A conveying wire according to claim 21, wherein the wire is made as a balanced wire comprising at least seven strands that each are made of paraamide fibers which are individually surface treated with a polymer providing wear against bending by the fibers and adhesion to the outer jacket which consists of a polyurethane.

23. A conveying wire according to claim 14, wherein the wire is made as a balanced wire comprising at least seven strands that each are made of paraamide fibers which are individually surface treated with a polymer providing wear against bending by the fibers and adhesion to the outer jacket which consists of a polyurethane.

24. A conveying wire according to claim 14, wherein the wire is made with strands with lays having a length of the magnitude 50-150 mm. so that elongation of the wire is lessened.

25. A wire according to claim 24, wherein the lays have a length of about 100 mm.

26. A conveying wire according to claim 14, wherein the wire is made as a balanced wire comprising strands that each are made of threads of steel, where the wire under heating by extrusion has been provided with the outer jacket consisting of polyurethane and which thereby has been integrated with the wire.

27. A conveying wire including disc-shaped conveying members for use in endless tube conveyor systems, the wire comprising twisted strands that each are made of threads or fibers, and including an outer jacket to which the conveying members are fastened directly by injection moulding, wherein the outer jacket comprises of a polymer with a melting temperature which is lower than the melting temperature of the plastic material from which the conveying members are injection moulded.

28. A conveying wire according to claim 27, wherein the conveying members comprise of synthetic material with a melting temperature which is 10-40° C. higher than the melting temperature of the outer jacket which comprises a polymer.

29. A conveying wire according to claim 27, wherein the conveying members comprise of polyamide with a melting temperature which is 20-30° C. higher than the melting temperature of the outer jacket which comprises polyurethane.

30. A conveying wire according to claim 27, wherein the wire is made as a balanced wire comprising at least three strands that each are made of synthetic fibers which are individually surface treated with a polymer, providing wear against bending by the fibers and adhesion to the outer jacket which comprises of a polymer.

31. A conveying wire according to claim 27, wherein the wire is made as a balanced wire comprising at least seven strands that each are made of paraamide fibers which are individually surface treated with a polymer providing wear against bending by the fibers and adhesion to the outer jacket which comprises a polyurethane.

32. A conveying wire according to claim 27, wherein the wire is made with strands with lays having a length of the magnitude 50-150 mm. so that elongation of the wire is lessened.

33. A wire according to claim 27, wherein the lays have a length of about 100 mm.

* * * * *